US008660824B2

(12) United States Patent
Williams

(10) Patent No.: US 8,660,824 B2
(45) Date of Patent: Feb. 25, 2014

(54) DISCRETELY GRIDDING COMPLEX FRACTURING FOR SIMULATION

(75) Inventor: Michael John Williams, Ely (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 227 days.

(21) Appl. No.: 12/977,263

(22) Filed: Dec. 23, 2010

(65) Prior Publication Data

US 2012/0166153 A1 Jun. 28, 2012

(51) Int. Cl.
*G06F 7/60* (2006.01)
(52) U.S. Cl.
USPC .............................................. 703/2
(58) Field of Classification Search
USPC ............. 703/1–28, 152.01–152.62; 702/6–13
See application file for complete search history.

(56) References Cited

U.S. PATENT DOCUMENTS

| 5,831,935 | A * | 11/1998 | Luo et al. ................... 367/47 |
| 6,106,561 | A | 8/2000 | Farmer |
| 6,230,101 | B1 | 5/2001 | Wallis |
| 6,388,947 | B1 | 5/2002 | Washbourne |
| 6,693,631 | B2 * | 2/2004 | Hubeli et al. ............... 345/420 |
| 6,823,297 | B2 | 11/2004 | Jenny |
| 6,912,491 | B1 | 6/2005 | Van Bemmel |
| 7,248,259 | B2 * | 7/2007 | Fremming ................... 345/420 |
| 7,542,037 | B2 * | 6/2009 | Fremming ................... 345/420 |
| 2003/0132934 | A1 * | 7/2003 | Fremming ................... 345/419 |
| 2003/0216897 | A1 | 11/2003 | Endres |
| 2004/0199329 | A1 | 10/2004 | Stone |
| 2005/0015231 | A1 | 1/2005 | Edwards |
| 2005/0115711 | A1 | 6/2005 | Williams |
| 2006/0197759 | A1 * | 9/2006 | Fremming ................... 345/420 |
| 2006/0265204 | A1 | 11/2006 | Wallis |
| 2007/0010979 | A1 | 1/2007 | Wallis |
| 2008/0040086 | A1 | 2/2008 | Betancourt |
| 2008/0120076 | A1 | 5/2008 | Thambynayagam |
| 2008/0255816 | A1 | 10/2008 | Neville |
| 2011/0120702 | A1 * | 5/2011 | Craig ......................... 166/250.1 |
| 2011/0251830 | A1 * | 10/2011 | Hilliard et al. ..................... 703/1 |
| 2011/0259599 | A1 * | 10/2011 | Walker et al. ................. 166/369 |
| 2012/0022837 | A1 * | 1/2012 | Asbury et al. ..................... 703/2 |

OTHER PUBLICATIONS

A Comparison Between Different Techniques of Fractures Modelling, Massimo Famiglietti, San Donato Milanese, Oct. 20-21, 2012, Eni Corporate University.*
White, Christopher D. et al, "Identifying and Estimating Significant Geologic Parameters With Experimental Design," SPE Journal, Sep. 2001, pp. 311-324.

(Continued)

*Primary Examiner* — Omar Fernandez Rivas
*Assistant Examiner* — Maryam Ipakchi
(74) *Attorney, Agent, or Firm* — Lam Nguyen; Rodney Warfford

(57) ABSTRACT

Embodiments of methods and systems for improved gridding of complex networks such as geological fractures are disclosed. In at least one embodiment, a method in accordance with the present disclosure includes adjusting a location of at least one non-fixed pillar of an initial grid, including: establishing a multi-point stencil of pillars that includes the at least one non-fixed pillar; selecting a fixed pillar of the initial grid toward which the non-fixed pillar is to be adjusted; determining a distance from each pillar of the multi-point stencil to the selected fixed pillar; calculating an inverse-distance weighted mean position based on the determined distances of the pillars of the multi-point stencil; and adjusting a position of the at least one non-fixed pillar to the inverse-distance weighted mean position.

20 Claims, 5 Drawing Sheets

(56) References Cited

OTHER PUBLICATIONS

Schlumberger, "Ocean for Petrel 2007.2 release".
Schlumberger, "Petrel 2009—What's New," 2008.
King, Michael J. et al., "Optimal Coarsening of 3D Reservoir Models for Flow Simulation," SPE International, 2005 SPE Annual Technical Conference and Exhibition, Oct. 9-12, 2005, pp. 1-15, SPE 95759, Dallas, Texas USA.
Schlumberger, "Petrel," Petrel* seismic-to-simulation software, Version 2007.1, Petrel VR Configuratin and user guide, 2000-2007, pp. 1-33.
United Kingdom Cabinet Office, "Archiving Geological and Reservoir Simulation Models—A Consultation Document".
Webb, et al., "Enabling the "Big Loop" Consistent Geological and Simulation Models", Roxar Maxiumum Reservoir Performance, AAPG Technical Conference and Exhibition, Long Beach, California, USA, Apr. 4, 2007.
Cipolla, et al., "Hydraulic fracture monitoring to reservoir simulation: Maximizing value", SPE Annual Techical Conference and Exhibition, Florence, Italy, Sep. 19-22, 2010, SPE 133877.
Williams, et al. "Quantitative interpretation of major planes from microseismic event locations with application in production prediction", SEG 2010 Annual Meeting, Denver, Colorado.
Williams-Stroud, "Using Microseismic Events to Constrain Fracture Network Models and Implication for Generating Fracture Flow Properties for Reservoir Simulation", SPE Shale Gas Production Conference, Forth Worth, Texas, USA, Nov. 16-18, 2008, SPE 119895.

\* cited by examiner

DISCRETELY GRIDDING COMPLEX FRACTURING FOR SIMULATION

FIELD OF THE INVENTION

The present disclosure relates to computational simulation and analysis of geological formations, and more specifically, to discretely gridding complex fractures in geological formations for numerical simulations.

BACKGROUND

Discretely gridding complex fracturing for reservoir and geomechanical simulations is difficult in the case where the fractures cannot be considered orthogonal to the grid orientation. In some circumstances, approximations are possible which remove the need for discretely gridding, and alternatives such as dual porosity models or equivalent wells can be valid. The discrete gridding of fractures is still desirable, for example, for the explicit modeling of the near-fracture flow and stress. Thus, although desirable results have been achieved using conventional techniques, there is room for improvement.

SUMMARY

The present disclosure relates to systems and methods for discretely gridding complex fracturing for simulation. Embodiments of methods and systems in accordance with the teachings of the present disclosure may advantageously provide improved grids for performing simulations, including grids about complex networks such as geological fractures.

In at least one embodiment, a method in accordance with the present disclosure includes adjusting a location of at least one non-fixed pillar of an initial grid, including: establishing a multi-point stencil of pillars that includes the at least one non-fixed pillar; selecting a fixed pillar of the initial grid toward which the non-fixed pillar is to be adjusted; determining a distance from each pillar of the multi-point stencil to the selected fixed pillar; calculating an inverse-distance weighted mean position based on the determined distances of the pillars of the multi-point stencil; and adjusting a position of the at least one non-fixed pillar to the inverse-distance weighted mean position.

This summary is merely intended to provide a brief synopsis of one or more possible implementations of, and possible aspects or advantages of, systems and methods in accordance with at least some embodiments of the present disclosure. This summary is further intended as merely an aid to the reader's understanding of such particular embodiments, and is not intended to define or limit other embodiments of systems and methods disclosed elsewhere herein.

BRIEF DESCRIPTION OF THE DRAWINGS

The detailed description is described with reference to the accompanying figures, in which similar or identical reference numerals may be used to identify common or similar elements.

DETAILED DESCRIPTION

This disclosure is directed to methods and systems for discretely gridding complex fractures in geological formations for numerical simulations. More specifically, embodiments of methods and systems in accordance with the teachings of the present disclosure may allow features such as complex fractures or well-bores to be gridded with a fine mesh and the remainder of the grid to be meshed successively coarser, providing a suitable structure for simulating detailed smaller-scale processes within a large reservoir model. Methods and systems in accordance with the present disclosure may advantageously allow control over neighboring cell volumes, a known deficiency in existing methods, so that the cell-to-cell volume ratio is guaranteed to lie within the numerically allowable range of the simulator. In some embodiments, the features may be gridded first, allowing, for example, smooth fracture edges, with the remainder of the grid being subsequently defined.

Exemplary Processes

Figure 1:
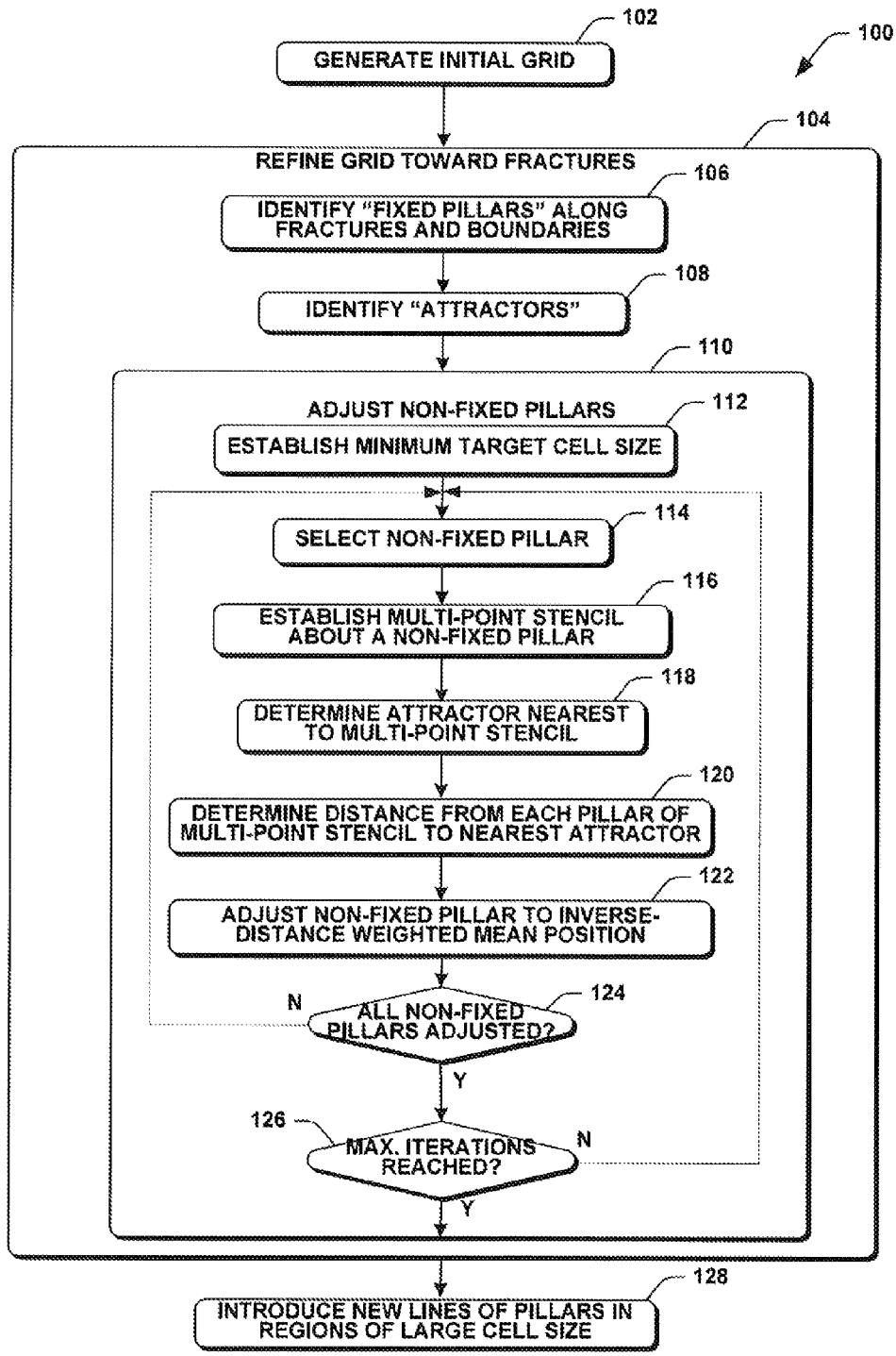
FIG. 1 is a flowchart of an embodiment of an exemplary process in accordance with the teachings of the present disclosure.

FIG. 1 is a flowchart of an embodiment of an exemplary process 100 in accordance with the teachings of the present disclosure. In this embodiment, the process 100 includes generating an initial grid using a fracture network as a gridding target (e.g. faults) at 102. The initial grid may be generated using a conventional grid generation utility such as, for example, the grid generation utility available in the Petrel simulation package commercially available from Schlumberger.

In some embodiments, the generation of the initial grid (at 102) may include converting a discrete fracture network (DFN) object (e.g. using Petrel) into a set of "fault sticks." The fault sticks may then be used to define faults (or fractures) for the grid generation utility to use as gridding targets. The grid generation utility may then be operated to provide a suitably fine grid (e.g. 5 ft spacing) around and along the faults. A conventional grid generation utility such as Petrel may be constrained to locally orient the grid around the faults, thereby providing local alignment of the grid along the faults.

Figure 2:
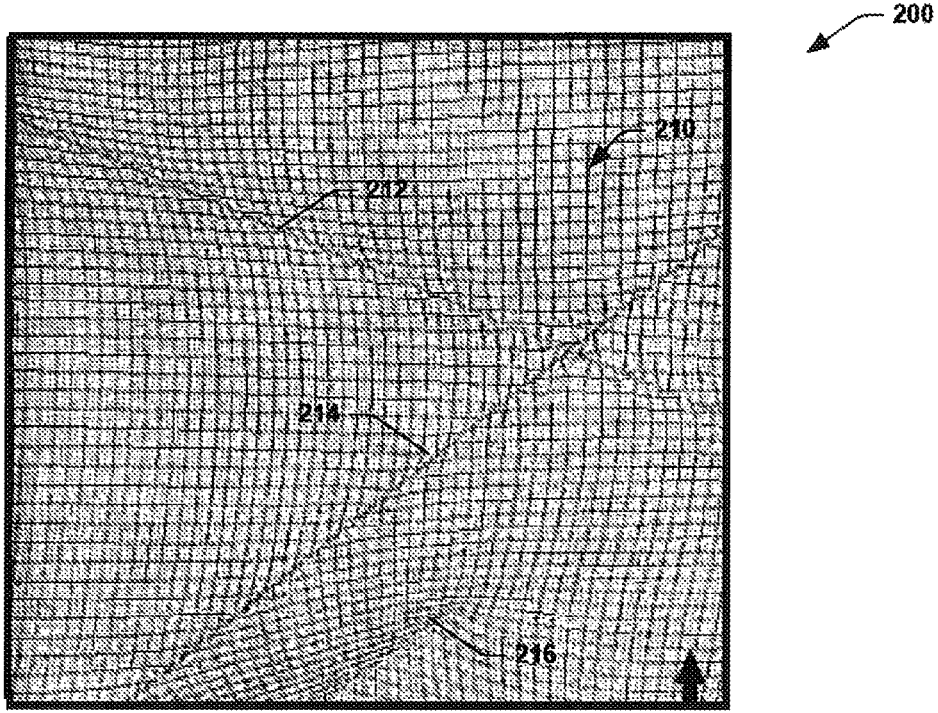
FIG. 2 shows an embodiment of an initial grid generated using a conventional grid generation utility that may be refined in accordance with the teachings of the present disclosure.

For example, FIG. 2 shows an embodiment of an initial grid 200 generated using a conventional grid generation utility. In this embodiment, the initial grid 200 is generated about a fracture network 210 that includes fractures 212, 214, 216. As shown in FIG. 2, in some embodiments, the initial grid 200 may be locally aligned along the fractures 212, 214, 216, and may provide a regular orthogonal grid away from the fractures 212, 214, 216.

Referring again to FIG. 1, after the initial grid is generated (at 102), the method 100 includes refining the grid toward the fractures at 104. More specifically, the refining of the grid toward the fractures (at 104) includes identifying so-called "fixed pillars," which are pillars in the grid which lie along target features (i.e. fractures 212, 214, 216) and boundaries at 106. The fixed pillars identified at 106 may include pillars along reservoir faults or fractures that are not subject to refined gridding.

A subset of the fixed pillars, referred to herein as "attractors," are identified at 108. The attractors may be one or more fixed pillars toward which refined gridding is desired. In some embodiments, the attractors may be selected by an analyst who observes the fixed pillars and determines which are to be designated as attractors based on one or more various factors such as, for example, location with respect to fractures (or other target features), anticipated gradients in the proximity of the fixed pillars, or any other suitable factors. Alternately, the attractors may be selected by one or more software routines operating on one or more processors, or even by hardware devices (e.g. application-specific integrated circuits (ASICs) or the like), that implement suitable logic for selecting the attractors based on one or more various factors.

As shown in FIG. 1, the refinement of the grid (at 104) further includes adjustment of the non-fixed pillars at 110. In some embodiments, the adjustment of the non-fixed pillars (at 110) includes establishing a minimum target cell size at 112, such as by receiving a user-provided input, or performing one or more calculations based on one or more variables involved in a simulation to be performed using the grid, or any other suitable approaches.

Figure 3:
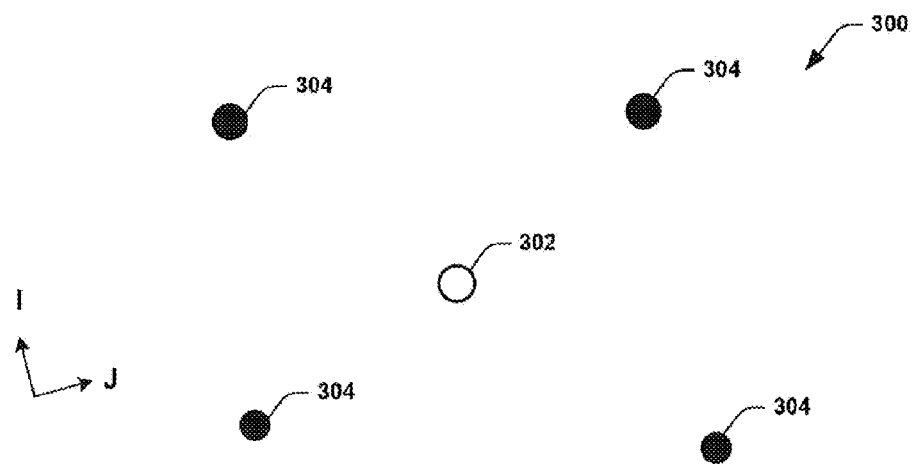
FIG. 3 shows an embodiment of a 5-point stencil in accordance with the teachings of the present disclosure.

A non-fixed pillar is selected at 114, and a multi-point stencil is defined using the selected non-fixed pillar at 116. For example, in some embodiments, a "5-point" stencil is defined that includes a selected non-fixed pillar 302 and those pillars 304 on either side of the selected non-fixed pillar in both I and J directions. A representative embodiment of such a 5-point stencil 300 is shown in FIG. 3.

With continued reference to FIG. 1, after the multi-point stencil is defined (at 116), an attractor nearest to the multi-point stencil is determined at 118. For each pillar in the multi-point stencil, a distance from each pillar to the attractor is determined at 120. If the distance determined at 120 is less than the minimum target cell size established at 112, then the distance may be set to the minimum target cell size at 120. The position of the non-fixed pillar is then adjusted to the inverse-distance weighted mean position of the all of the pillars of the multi-point stencil at 122.

At 124, a determination is made as to whether all of the non-fixed pillars have been adjusted. If not, the method 100 returns to the selection of another non-fixed pillar at 114, and the above-described actions designated 114 through 122 are repeated until all of the non-fixed pillars have been adjusted.

When all of the non-fixed pillars have been adjusted (at 124), the method 100 determines whether a maximum number of grid refining iterations have been accomplished at 126. If not, the method 100 again returns to the selection of a non-fixed pillar at 114, and the above-described actions designated 114 through 122 are repeated until all of the positions of the non-fixed pillars have been adjusted the desired number of iterations (e.g. 500 iterations).

After the maximum number of refining iterations have been performed (at 126), the adjustment of the non-fixed pillars at 110 is complete, and the refinement of the grid toward the fractures at 104 is also complete. The method 100 may then terminate, or may proceed to other desired operations, such as, for example, performing a desired simulation of a geological formation using the refined grid.

In some embodiments, certain parts of the refined grid will contain relatively few cells initially, such as close to corners (or intersections) between fractures where neither fracture lies along the natural direction of the grid, leading to larger cell sizes in such regions than may be desired. In such embodiments, one or more new lines of pillars may optionally be introduced in regions of relatively few cells at 128 to provide a final grid.

Figure 4:
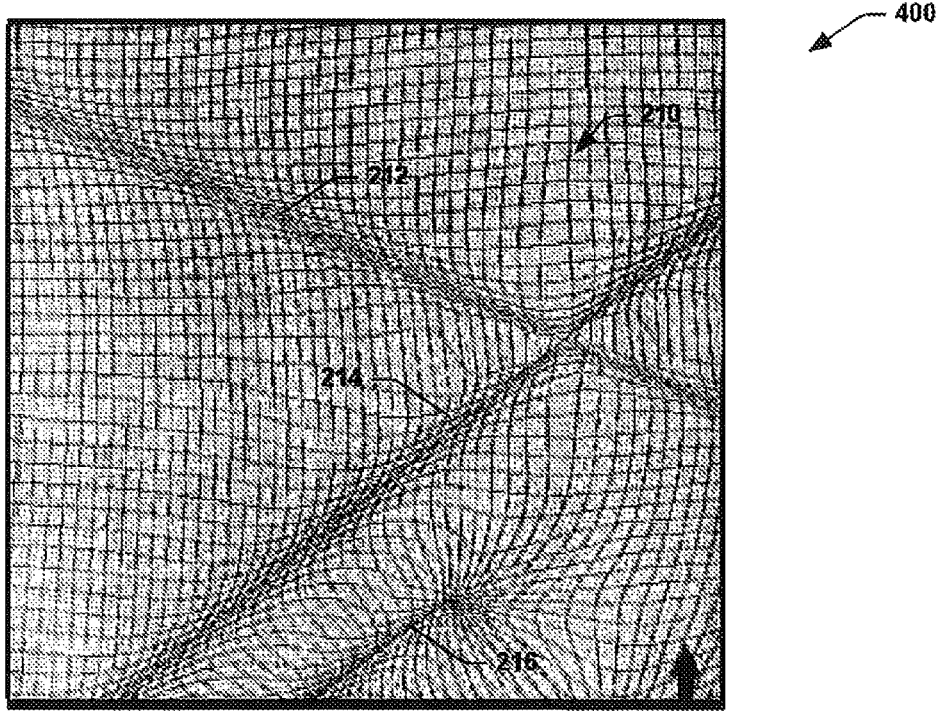
FIG. 4 shows an embodiment of a refined grid generated in accordance with the teachings of the present disclosure.

FIG. 4 shows a refined grid 400 generated by refining the initial grid 200 of FIG. 2 using the above-described method 100 of FIG. 1. Methods in accordance with the present disclosure provide desired refinement of the grid toward the fractures 212, 214, 216 of the fracture network 210 by treating the pillars along the fractures 212, 214, 216 as fixed and having an attraction somewhat analogous to a potential function which is used to adjust the positions of the non-fixed pillars toward the fractures 212, 214, 216.

It will be appreciated that grid refining methods in accordance with the teachings of the present disclosure may advantageously provide a relatively finer grid near the attractors, while maintaining an approximately orthogonal grid in the far field. Refined grids produced in accordance with the present disclosure may have the benefit of being corner-point rather than fully unstructured.

Figure 5:
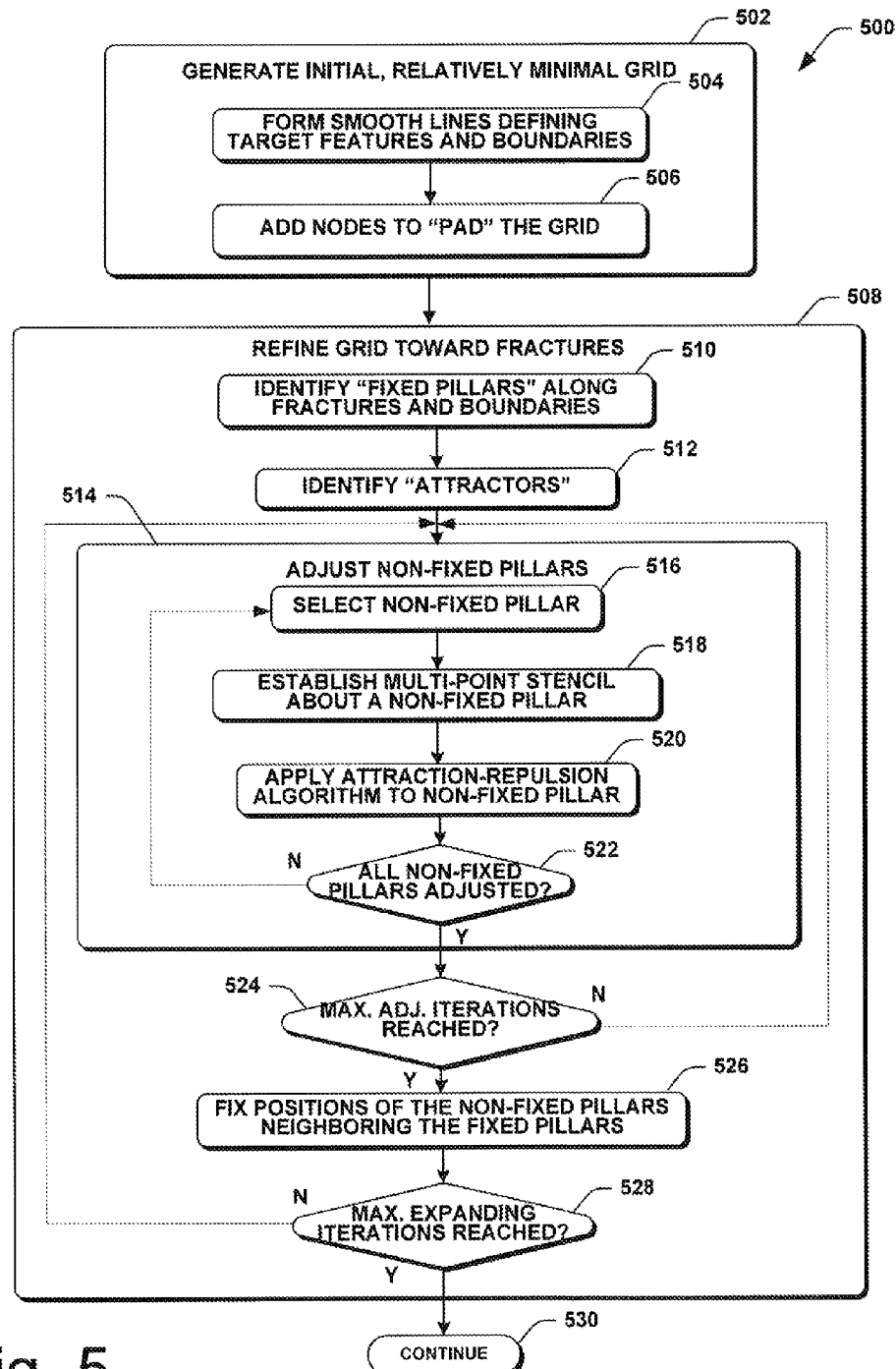
FIG. 5 is a flowchart of another embodiment of a process in accordance with the teachings of the present disclosure.

FIG. 5 is a flowchart of another embodiment of a process 500 in accordance with the teachings of the present disclosure. In this embodiment, an initial, relatively minimal (or sparse) grid is constructed at 502. The generation of the initial, relatively minimal grid (at 502) may include forming relatively smooth lines that represent the features to be gridded (e.g. fractures) and the boundaries at 504. Ensuring that the fractures are represented by relatively smooth lines may at least partially resolve an issue that may be encountered with finite-element geomechanics simulators which typically treat corners as stress-concentrators.

Figure 6:
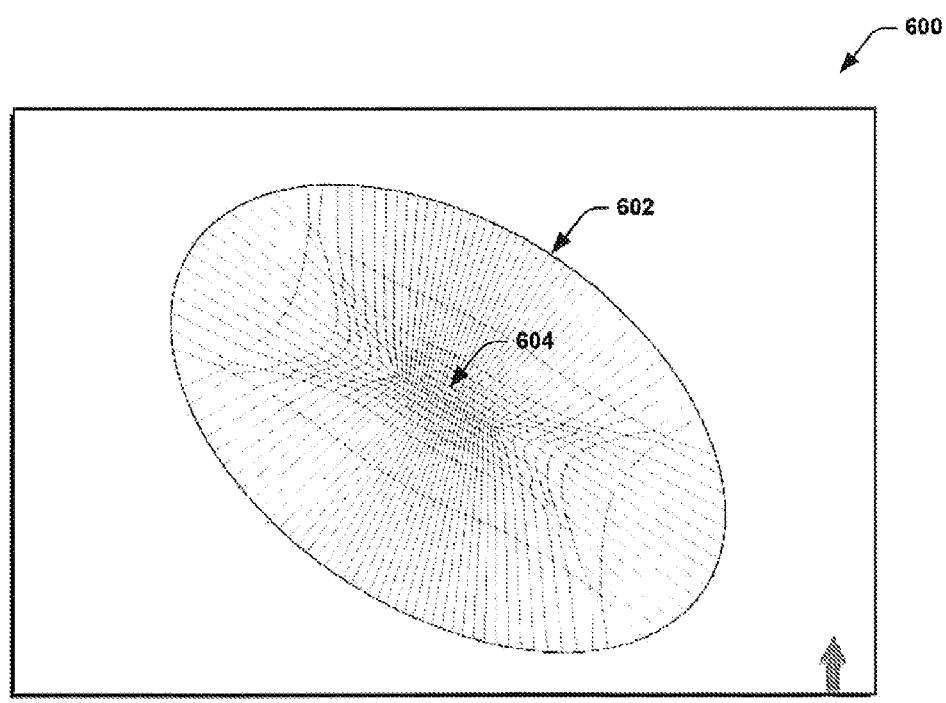
FIG. 6 is a schematic view of an exemplary initial grid having a boundary determined in accordance with the teachings of the present disclosure.

In at least some embodiments, the boundaries may be determined by establishing a control line. For example, in some implementations, the boundaries may be established by specifying an assumed drainage distance (or other suitable variable or factor). FIG. 6 shows a representative initial grid 600 having an oval boundary 602 that is formed about a target feature 604 by establishing a control line in this manner.

As further shown in FIG. 5, nodes may be added throughout the region being gridded at 506 to "pad" the grid. Following the addition of nodes at 506, the grid may have many pillars in non-ideal locations, which may result in neighbor-to-neighbor cell volume ratios having a widely varying range of values. This may be undesirable for certain simulation routines (e.g. finite difference flow models, etc.) which may provide improved results for cell volume ratios having relatively smaller values (e.g. less than 10).

The method 500 further includes refining the grid toward the fractures at 508. In some embodiments, the refinement of the initial grid (at 508) may be accomplished using one or more of the operations described above, such as the grid refinement operations described above and shown at 104 of FIG. 1. In further embodiments, one or more of the grid refinement operations described above may be modified (or eliminated).

For example, in some implementations, refinement of the initial grid (at 508) may include identifying fixed pillars along fractures and boundaries at 510, and identifying attractors at 512. The grid refinement (at 508) may also include adjustment of non-fixed pillars at 514. The adjustment of non-fixed pillars (at 514) may include selecting a non-fixed pillar at 516, and establishing a multi-point stencil about the non-fixed pillar at 518. In some implementations, the stencil may comprise a 25 point stencil, which in two-dimensional configurations may be represented by a 5×5 set of pillars in the I and J directions, respectively. The non-fixed pillar selected at 516 may be set as the central pillar in the stencil.

As further shown in FIG. 5, an attraction-repulsion algorithm is applied to the selected non-fixed pillar using the multi-point stencil at 520. More specifically, similar to the above-described embodiments, the attraction-repulsion algorithm may include determining a nearest attractor (similar to 118 of FIG. 1), determining distances from each pillar of the multi-point stencil to the nearest attractor (similar to 120 of FIG. 1), and adjusting the location of the non-fixed pillar to an inverse-distance weighted mean position of the multi-point stencil (similar to 122 of FIG. 1).

In some implementations, during the determination of the inverse-distance weighted mean position, the original location of the non-fixed pillar may be assigned a first weighting value (e.g. 10), a subset of the multi-point stencil (e.g. a 3×3 point subset centered around the non-fixed pillar) may be assigned a second weighting value (e.g. 5), and the remaining pillars of the multi-point stencil may be assigned a third weighting value (e.g. 1). Of course, in alternate implementations, the values of the first, second, and third weighting values may be adjusted as desired based on a variety of variables and/or user preferences to achieve a desirable results. Similarly, in alternate implementations, a greater (or lesser) number of subsets of the multi-point stencil may be defined having differing assigned weighting values based on a variety of variables and/or user preferences to achieve desirable results. Such approaches to determining the inverse-distance weighted mean position for adjustment of non-fixed pillars may advantageously provide a desired balancing of the position determination using pillars of the multi-point stencil.

After the position of each non-fixed pillar is adjusted to the inverse-distance weighted mean position of the multi-point stencil (at 520), a determination is made whether all non-fixed pillars have been adjusted at 522. If not, the method 500 returns to the selection of another non-fixed pillar at 516, and the above-described operations 516 through 520 are repeated until all non-fixed pillars have been adjusted. Once all non-fixed pillars have been adjusted (at 522), a determination is made whether a desired number of adjusting iterations have been performed at 524. If not, the method 500 returns to the adjustment of non-fixed pillars at 514, and the above-described operations 514 through 522 are repeated until the desired number of adjusting iterations have been performed.

As further shown in FIG. 5, in this embodiment, after the desired number of adjusting iterations has been performed, the neighbors of the fixed pillars may be fixed at 526, thereby expanding the set of fixed pillars. The method 500 then determines whether a desired number of expanding iterations have been performed (initially zero) at 528, and if not, the method 500 returns to adjusting the non-fixed pillars using the expanded set of fixed pillars (i.e. using a reduced number of non-fixed pillars) at 514, and the above-described operations 514 through 526 are repeated. Once the desired number of so-called "expanding" iterations have been performed, the method 500 may continue to other desired operations (e.g. additional grid manipulation operations, simulations, etc.) at 530 or terminate.

In some implementations, the maximum number of adjusting iterations (at 524) may be set to a suitably large value (e.g. 500 iterations), and for each successive expanding iteration (at 528), the number of adjusting iterations may be revised (e.g. reduced by half). The number of desired expanding iterations (at 528) may determined in a variety of suitable ways, including, for example, being preset (e.g. 6, 8, 10, etc.), interactively determined (e.g. user-specified based on analysis of the grid), or may be based on a variable or feature of the refined grid, such as a suitably small residual or variable representing a convergence of the grid adjustment operations.

It will be appreciated that embodiments of methods for refining an initial grid as disclosed herein may provide substantial advantages over prior art methods. For example, embodiments of methods in accordance with the present disclosure may advantageously reduce or eliminate improper cell sizes or shapes near target features such as faults. Step changes in cell sizes and other undesirable variability in cell sizes and shapes may be alleviated, thereby providing grids having cells that are more appropriate for simulations, including coupled solution techniques.

Exemplary Environment

Figure 7:
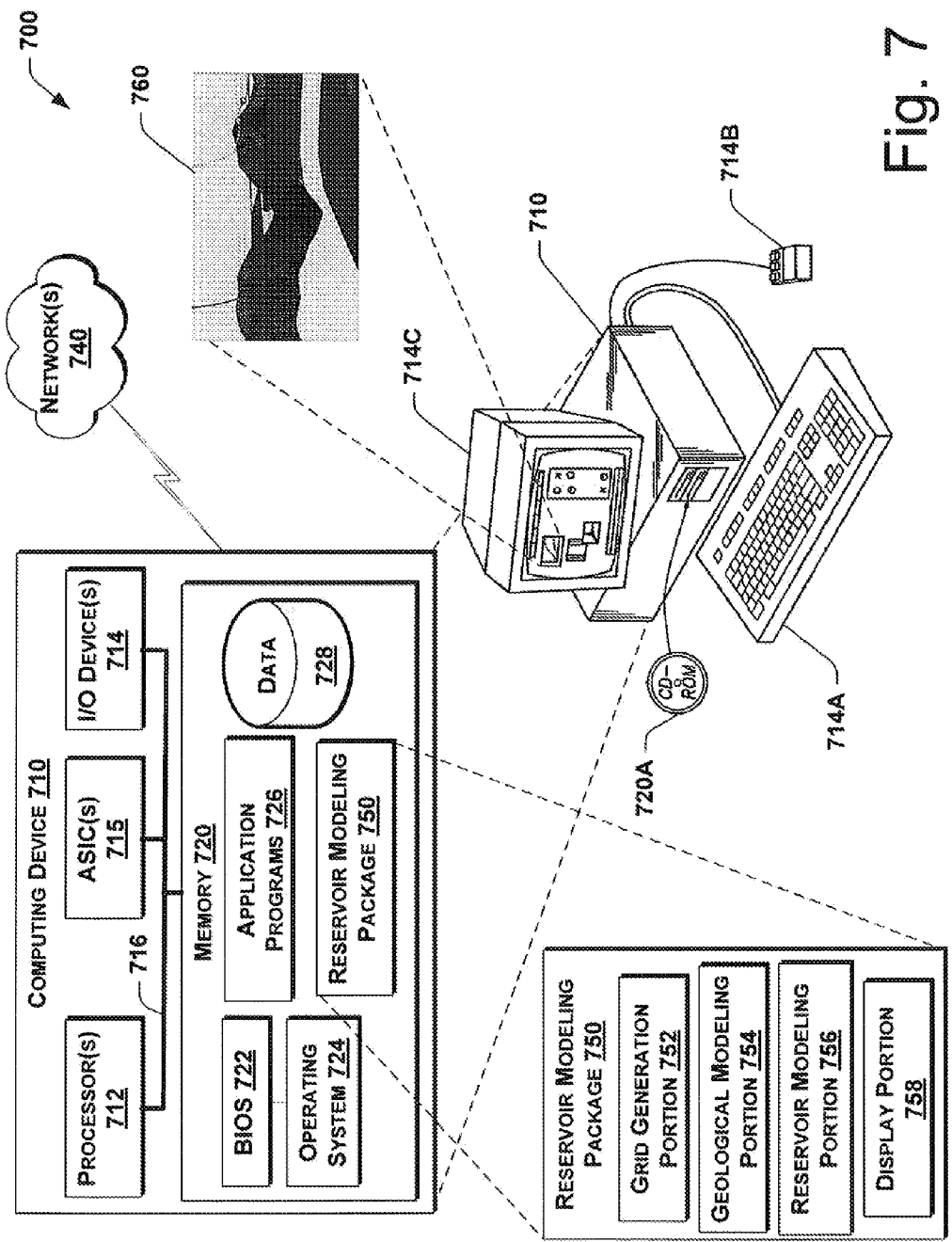
FIG. 7 illustrates an exemplary environment in which various embodiments of systems and methods in accordance with the teachings of the present disclosure can be implemented.

Systems and methods for coarsening and splitting grids in accordance with the teachings of the present disclosure may be implemented in a variety of computational environments. For example, FIG. 7 illustrates an exemplary environment 700 in which various embodiments of systems and methods in accordance with the teachings of the present disclosure can be implemented. In this implementation, the environment 700 includes a computing device 710 configured in accordance with the teachings of the present disclosure. In some embodiments, the computing device 710 may include one or more processors 712 and one or more input/output (I/O) devices 714 coupled to a memory 720 by a bus 716. One or more Application Specific Integrated Circuits (ASICs) 715 may be coupled to the bus 716 and configured to perform one or more desired functionalities described herein.

The one or more processors 712 may be composed of any suitable combination of hardware, software, or firmware to provide the desired functionality described herein. Similarly, the I/O devices 714 may include any suitable I/O devices, including, for example, a keyboard 714A, a cursor control device (e.g. mouse 714B), a display device (or monitor) 714C, a microphone, a scanner, a speaker, a printer, a network card, or any other suitable I/O device. In some embodiments, one or more of the I/O components 714 may be configured to operatively communicate with one or more external networks 740, such as a cellular telephone network, a satellite network, an information network (e.g. Internet, intranet, cellular network, cable network, fiber optic network, LAN, WAN, etc.), an infrared or radio wave communication network, or any other suitable network. The system bus 716 of the computing device 710 may represent any of the several types of bus structures (or combinations of bus structures), including a memory bus or memory controller, a peripheral bus, an accelerated graphics port, and a processor or local bus using any of a variety of bus architectures.

The memory 720 may include one or more computer-readable media configured to store data and/or program modules for implementing the techniques disclosed herein. For example, the memory 720 may host (or store) a basic input/output system (BIOS) 722, an operating system 724, one or more application programs 726, and program data 728 that can be accessed by the processor 712 for performing various functions disclosed herein.

The computing device 710 may further include a reservoir modeling package 750 in accordance with the teachings of the present disclosure. As depicted in FIG. 7, the reservoir modeling package 750 may be stored within (or hosted by) the memory 720. In alternate implementations, however, the reservoir modeling package 750 may reside within or be distributed among one or more other components or portions of the computing device 710. For example, in some implementations, one or more aspects of the reservoir modeling functionality described herein may reside in one or more of the processors 712, the I/O devices 714, the ASICs 715, or the memory 720.

In the present disclosure, various techniques may be described in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media may include, but is not limited to, random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the computing device 710. Combinations of any of the above should also be included within the scope of computer readable media.

Moreover, the computer-readable media included in the system memory 720 can be any available media that can be accessed by the computing device 710, including removable computer storage media (e.g. CD-ROM 720A) or non-removeable storage media. Computer storage media may include both volatile and nonvolatile media implemented in any method or technology for storage of information such as computer-readable instructions, data structures, program modules, or other data. Generally, program modules executed on the computing device 710 may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

It will be appreciated that the computing device 710 is merely exemplary, and represents only one example of many possible computing devices and architectures that are suitable for use in accordance with the teachings of the present disclosure. Therefore, the computing device 710 shown in FIG. 7 is not intended to suggest any limitation as to scope of use or functionality of the computing device and/or its possible architectures. Neither should computing device 710 be interpreted as having any dependency or requirement relating to any one or combination of components illustrated in the example computing device 710.

Embodiments of methods of grid refinement for discretely gridding complex fracturing in accordance with the teachings of the present disclosure may be integrated into a wide variety of grid generation utilities. For example, FIG. 7 further shows that the exemplary reservoir modeling package 750 may include a grid generation portion 752, a geological modeling portion 754, a reservoir modeling portion 756, and a display portion 758. The grid generation portion 752 may be configured to provide refined grids for discretely gridding complex fracturing for simulations of geological structures, hydrocarbon reservoirs, or other desired simulations (generally represented in FIG. 7 by simulation result 760), in accordance with the teachings of the present disclosure.

In general, unless otherwise stated herein, the components of the reservoir modeling package 750 depicted in FIG. 7 may be variously combined with one or more other components, or eliminated, to provide further possible embodiments of reservoir modeling packages in accordance with the teachings of the present disclosure. For example, in some embodiments, the grid generation portion 752 may be part of the geological modeling portion 754. Similarly, the display portion 758 may be part of the reservoir modeling portion 756, or the geological modeling portion 754, or any other portion of the reservoir modeling package 750. In further embodiments, any or all of the components of the reservoir modeling package 750 may be separated as discrete, stand alone utilities.

It will be appreciated that the preparation of grids using the grid generation portion 752 may incorporate one or more methods in accordance with the teachings of the present disclosure. Of course, methods and systems for grid refinement are not limited to the specific modeling examples described in this disclosure, such as reservoir modeling or geological formation modeling, but may be suitably applied in virtually any ridding utilities that may be used in a wide variety of technical fields (e.g. aerospace flowfield analyses, structural analyses, etc.).

Also, other than the grid generation portion 752, it will be appreciated that one or more of the components of the reservoir modeling package 750 depicted in FIG. 7 may comprise conventional components. For example, in some implementations, the geological modeling portion 754 may be a software package known as Petrel®, which is commercially-available from Schlumberger Technology Corporation. Similarly, in some implementations, the reservoir modeling portion 756 may be a conventional software package known as Eclipse®, which is also commercially-available from Schlumberger Technology Corporation.

In general, the use of methods in accordance with the teachings of the present disclosure may be performed separately, or may be combined with a wide variety of utilities and applications that employ generally known techniques, and therefore will not be described in detail herein. Such known techniques include, for example, those techniques described in the following references and incorporated herein by reference: "Petrel Version 2007.1—Petrel VR Configuration and User Guide," by Schlumberger Technology Corporation (2007); "Archiving Geological and Reservoir Simulation Models—A Consultation Document," UK Department of Trade and Industry, (2004); "Optimal Coarsening of 3D Reservoir Models for Flow Simulation," by King et al., SPE (Society of Petroleum Engineering) 95759 (October 2005); "Top-Down Reservoir Modeling," by Williams et al., SPE 89974 (September 2004); and U.S. Pat. No. 6,106,561 issued to Farmer and assigned to Schlumberger Technology Corporation. Other known techniques include, for example, those techniques employed in other conventional tools, including those tools used for simulation, modeling, and display available from or produced by, for example, Gemini Solutions, Inc., BP, Chevron, Roxar, Texas A&M University, and any other suitable techniques and tools.

CONCLUSION

Although embodiments of systems and methods for generating improved grids for performing simulations have been described in language specific to analyzing geological fractures, it is to be understood that the subject of the appended claims is not necessarily limited to the specific features or methods described.

What is claimed is:

1. A method of refining an initial grid about one or more target features, comprising:
   identifying one or more fixed pillars located along one or more target features;
   identifying one or more attractors from among the one or more fixed pillars; and
   adjusting a position of at least one non-fixed pillar, including:
      establishing a multi-point stencil of pillars that includes the at least one non-fixed pillar;
      determining a distance from each pillar of the multi-point stencil of pillars to a nearest one of the one or more attractors;
      computing an inverse-distance weighted multivariate interpolation mean position based on the determined distances of the multi-point stencil of pillars and weighting values that decrease with respect to distance from the position of each of the at least one non-fixed pillar; and
      moving the at least one non-fixed pillar to the inverse-distance weighted multivariate interpolation mean position;
      wherein at least one above-identified operation is at least partially implemented using a processing device.

2. The method of claim 1, wherein refining the initial grid about the one or more target features further comprises:
   fixing one or more positions of one or more of the at least one non-fixed pillar after moving the at least one non-fixed pillar; and
   repeating refining of the grid about the one or more target features to move at least one other non-fixed pillar.

3. The method of claim 1, wherein the initial grid includes a plurality of non-fixed pillars, and wherein refining the initial grid about the one or more target features further comprises:
   forming an expanded set of fixed pillars by fixing one or more positions of one or more of the non-fixed pillars after moving the one or more of the non-fixed pillars; and
   repeating refining of the grid about the one or more target features using the expanded set of fixed pillars.

4. The method of claim 1, wherein establishing a multi-point stencil of pillars that includes the at least one non-fixed pillar includes:
   establishing a five-point stencil of pillars that includes the at least one non-fixed pillar and pillars on either side of the at least one non-fixed pillar in both I and J directions.

5. The method of claim 1, wherein computing an inverse-distance weighted multivariate interpolation mean position based on the determined distances of the multi-point stencil of pillars includes:
   assigning a first weighting value to at least one first distance associated with the at least one non-fixed pillar of the multi-point stencil; and
   assigning a second weighting value to at least one second distance associated with one or more second pillars of the multi-point stencil.

6. The method of claim 5, wherein the multi-point stencil of pillars comprises at least nine pillars, and wherein the at least one second distance corresponds to respective distances of at least eight pillars of the multi-point stencil which, together with the non-fixed pillar, form a 3 by 3 array of pillars.

7. The method of claim 5, wherein computing an inverse-distance weighted multivariate interpolation mean position based on the determined distances of the multi-point stencil of pillars further comprises:
   assigning a third weighting value to at least one third distance associated with one or more third pillars of the multi-point stencil.

8. The method of claim 1, further comprising:
   providing the initial grid about the one or more target features, including defining a control line to serve as a grid boundary, the control line being established by an assumed drainage distance.

9. One or more non-transitory computer-readable media bearing computer-readable instructions which, when executed, perform a process comprising:
   functionality operable by one or more processing devices to perform one or more operations on an initial grid formed about one or more target features, including:
      fixing locations of one or more pillars of the initial grid;
      designating one or more of the fixed pillars as an attractor toward which at least one non-fixed pillar will be adjusted;
      adjusting a location of the at least one non-fixed pillar, including:
         establishing a multi-point stencil of pillars that includes the at least one non-fixed pillar;
         selecting a nearest one of the one or more attractors;
         determining a distance from each pillar of the multi-point stencil to the nearest one of the one or more attractors;
         calculating an inverse-distance weighted multivariate interpolation mean position based on the determined distances of the pillars of the multi-point stencil and weighting values that decrease with respect to distance from the location of each of the at least one non-fixed pillar; and
         moving the at least one non-fixed pillar to the inverse-distance weighted multivariate interpolation mean position.

10. The one or more non-transitory computer-readable media of claim 9, wherein the initial grid includes a plurality of non-fixed pillars, and wherein one or more grid refining operations further comprises:
    forming an expanded set of fixed pillars by fixing one or more positions of one or more of the non-fixed pillars after moving the one or more of the non-fixed pillars; and
    repeating refining of the grid about the one or more target features using the expanded set of fixed pillars.

11. The one or more non-transitory computer-readable media of claim 9, wherein adjusting a location of the at least one non-fixed pillar comprises: iteratively adjusting locations of a plurality of non-fixed pillars.

12. The one or more non-transitory computer-readable media of claim 9, wherein establishing a multi-point stencil of pillars that includes the at least one non-fixed pillar includes:
    establishing a stencil having at least five pillars that includes the at least one non-fixed pillar and pillars on either side of the at least one non-fixed pillar in both I and J directions.

13. The one or more non-transitory computer-readable media of claim 9, wherein calculating an inverse-distance weighted multivariate interpolation mean position based on the determined distances of the multi-point stencil of pillars includes:

assigning a first weighting value to at least one first distance associated with the at least one non-fixed pillar of the multi-point stencil; and assigning a second weighting value to at least one second distance associated with one or more second pillars of the multi-point stencil.

14. The one or more non-transitory computer-readable media of claim 9, wherein the multi-point stencil of pillars comprises at least nine pillars, and wherein the at least one second distance corresponds to respective distances of at least eight pillars of the multi-point stencil which, together with the non-fixed pillar, form a 3 by 3 array of pillars.

15. The one or more non-transitory computer-readable media of claim 9, wherein the functionality operable by at least one of the one or more processing devices further comprises:

generating the initial grid about the one or more target features.

16. The one or more non-transitory computer-readable media of claim 15, wherein generating the initial grid about the one or more target features comprises:

defining the one or more target features using one or more relatively smooth lines; and defining a control line to serve as a grid boundary, the control line being established by an assumed drainage distance.

17. One or more non-transitory computer-readable media bearing computer-readable instructions which, when executed, perform a process comprising:

adjusting a location of at least one non-fixed pillar of an initial grid, including:

establishing a multi-point stencil of pillars that includes the at least one non-fixed pillar;

selecting a fixed pillar of the initial grid toward which the non-fixed pillar is to be adjusted;

determining a distance from each pillar of the multi-point stencil to the selected fixed pillar;

calculating an inverse-distance weighted multivariate interpolation mean position based on the determined distances of the pillars of the multi-point stencil and weighting values that decrease with respect to distance from the location of each of the at least one non-fixed pillar; and adjusting a position of the at least one non-fixed pillar to the inverse-distance weighted multivariate interpolation mean position.

18. The one or more non-transitory computer-readable media of claim 17, wherein the initial grid includes a plurality of non-fixed pillars, and wherein the process further comprises:

forming an expanded set of fixed pillars by fixing one or more positions of one or more of the non-fixed pillars after moving the one or more of the non-fixed pillars; and repeating refining of the grid about the one or more target features using the expanded set of fixed pillars.

19. The one or more non-transitory computer-readable media of claim 17, wherein establishing a multi-point stencil of pillars that includes the at least one non-fixed pillar includes:

establishing a stencil having at least five pillars that includes the at least one non-fixed pillar and pillars on either side of the at least one non-fixed pillar in both I and J directions.

20. The one or more non-transitory computer-readable media of claim 17, wherein calculating an inverse-distance weighted multivariate interpolation mean position based on the determined distances of the pillars of the multi-point stencil includes:

assigning a first weighting value to at least one first distance associated with the at least one non-fixed pillar of the multi-point stencil; and assigning a second weighting value to at least one second distance associated with one or more second pillars of the multi-point stencil.

* * * * *